(12) United States Patent
Russo et al.

(10) Patent No.: US 8,572,344 B2
(45) Date of Patent: Oct. 29, 2013

(54) STORAGE DEVICE ERASE COMMAND HAVING A CONTROL FIELD CONTROLLABLE BY A REQUESTOR DEVICE

(75) Inventors: Leonard E. Russo, Tomball, TX (US); Valiuddin Y Ali, Cypress, TX (US); Lan Wang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 13/260,300

(22) PCT Filed: May 4, 2009

(86) PCT No.: PCT/US2009/042680
§ 371 (c)(1),
(2), (4) Date: Sep. 24, 2011

(87) PCT Pub. No.: WO2010/128963
PCT Pub. Date: Nov. 11, 2010

(65) Prior Publication Data
US 2012/0023303 A1    Jan. 26, 2012

(51) Int. Cl.
*G06F 12/06* (2006.01)
*G06F 9/312* (2006.01)
(52) U.S. Cl.
USPC .................... 711/166; 711/154; 711/E12.022
(58) Field of Classification Search
USPC .......................... 711/103, 154, 166, E12.022
See application file for complete search history.

(56) References Cited

U.S. PATENT DOCUMENTS

| 2007/0005659 A1 | 1/2007 | Lemoal et al. |
| 2009/0083347 A1 | 3/2009 | Haga |
| 2010/0174865 A1* | 7/2010 | Koester ......................... 711/114 |
| 2011/0004726 A1* | 1/2011 | Haukness et al. ............. 711/103 |

FOREIGN PATENT DOCUMENTS

| KR | 1020080098164 | 11/2008 |
| WO | WO-2008029389 | 3/2008 |

OTHER PUBLICATIONS

CMRR Protocols for Disk Drive Secure Erase, Gordon F. Hughes, Oct. 2004 (6 pages).
Enhanced Security Erase Unit Proposal, Dan Colegrove, IBM Corporation, Oct. 15, 1996 (3 pages).
HP White Paper, HP Secure Erase for Imaging and Printing, Jan. 20078 (8 pages).

(Continued)

*Primary Examiner* — Hal Schnee

(57) ABSTRACT

A storage device includes storage media and a controller to control access of the storage media. The controller receives an erase command used to specify an erase operation of at least one portion of the storage media. The erase command has a control field controllable by a requestor device that submitted the erase command to the storage device, where the control field has one or more portions settable to cause the storage device to perform one or more of: reporting a progress of the erase operation, and modifying an operational state of the erase operation.

18 Claims, 3 Drawing Sheets

(56) References Cited

OTHER PUBLICATIONS

International Searching Authority, International Search Report & Written Opinion, Appln. No. PCT/US2009/042680, date of mailing Jan. 25, 2010, 11 p.

Secure Erase of Disk Drive Data, Gordon Hughes and Tom Coughlin (2002) (8 pages).

Secure Erase, A Faster and Higher Level of Security, Part 2, vol. 3, Issue 6 ITAK, 2008 (2 pages).

TCG Specification Architecture Overview, Specification Version 1.4, Aug. 2, 2007 (54 pages).

TCG Storage Architecture Core Specification, Specification Version 2.00 Final Revision 1.00, Apr. 20, 2009 (314 pages).

* cited by examiner

STORAGE DEVICE ERASE COMMAND HAVING A CONTROL FIELD CONTROLLABLE BY A REQUESTOR DEVICE

BACKGROUND

Storage devices such as disk drives include storage media used for storing data, such as files, directories, and other types of data objects. Typically, when a user deletes a data object, the information that is actually deleted is the reference information to the data object. The actual data object still remains on the storage media even after deletion, which poses security or privacy concerns.

To actually remove data objects stored on storage media, storage device native secure erase commands have been defined that overwrite everything on a storage media in the storage device by repeatedly writing a predefined pattern (e.g., a pattern including a given number, followed by the given number's inverse, then the given number again and then sometimes followed by a zero, or some other pattern). The effect of writing theses patterns on storage media is that it reverses the polarity of the storage media in such a fashion that makes it very difficult to extract the original data from the media. This effectively destroys the original data stored on the storage media and renders the original data inaccessible. With some forms of storage media, reversing the polarity of a number in the pattern may not have to be performed. As yet another alternative, other mechanisms may be employed to ensure that the original data cannot be easily recovered.

An issue associated with conventional secure erase commands is that they may not provide some features that may be desirable to end users.

BRIEF DESCRIPTION OF THE DRAWINGS

Some embodiments of the invention are described with respect to the following figures.

DETAILED DESCRIPTION

Figure 1:
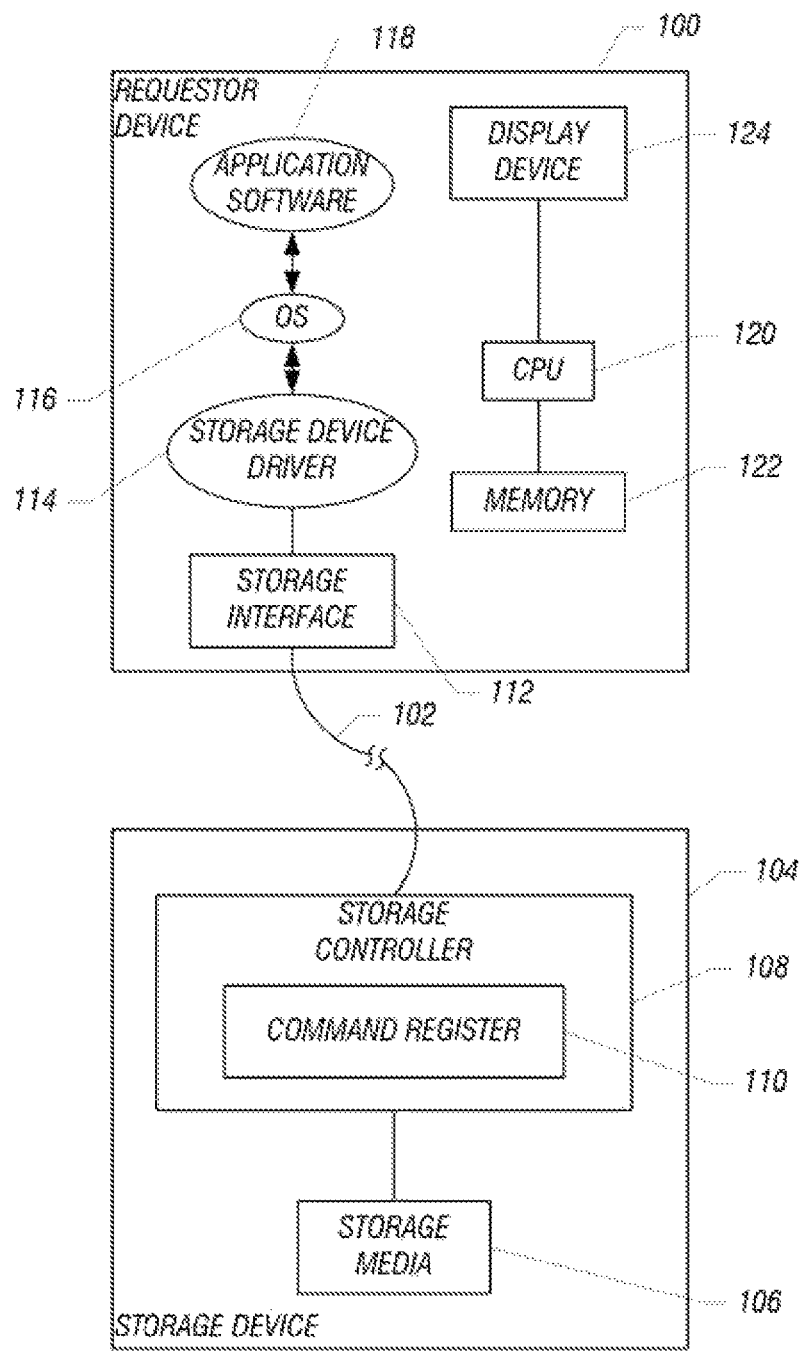
FIG. 1 is a block diagram of an exemplary arrangement that includes a storage device and a requestor device coupled to the storage device, in which an embodiment of the invention may be incorporated.

A secure erase command can be initiated by a requester device (e.g., a computer, a personal digital assistant, or other type of electronic device) to a storage device to destroy or remove the content stored on the storage media of the storage device by overwriting the content with a predefined pattern (all zeros or some other pattern). In some embodiments, the secure erase command is issued by firmware of the requestor device, where the firmware can include the BIOS (basic input/output system) or Unified Extensible Firmware Interface (UEFI) of the requester device. Alternatively, the secure erase command can be issued by software of the requester device. As used here, a "requestor device" refers to an electronic device that is capable of submitting a request to a storage device. The term "storage media" refers to one or more storage components, including disk-based media, semiconductor storage, or other type of storage. In one example, a secure erase command is defined by the AT Attachment specification, which defines a protocol to attach storage devices to a host device. According to the AT Attachment specification, a secure erase command is referred to as a Security Erase Unit command.

Although reference is made to the AT Attachment specification, it is noted that in other embodiments, secure erase commands can be defined by other protocols, or the secure erase commands can be customized commands not defined by a protocol. Another protocol that provides for secure erase commands is a protocol provided by the Trusted Computing Group (TCG).

Conventional secure erase commands are not flexible in terms of the features that they provide. For example, conventional secure erase commands do not allow for reporting of the progress of a secure erase operation performed in response to a secure erase command. Moreover, conventional secure erase commands do not allow a requester device to easily modify the operational state of the secure erase operation, where modification of the operational state of the erase operation includes one or more of the following: aborting the secure erase operation (which causes the erase operation to stop), interrupting the secure erase operation (which causes the storage device to be interrupted to perform another task before resuming the erase operation), pausing the secure erase operation, or restarting the secure erase operation (after the erase operation has been paused). The inability to gather the current progress of the secure operation or to control the operational state of the secure erase operation may result in an unsatisfactory user experience. For example, a user will not be able to determine how much longer a secure erase operation will take to complete. As another example, a user will not be able to pause and restart the secure erase operation at a later stage when it is more convenient.

In accordance with some embodiments, a control field is provided in the secure erase command that is controllable by a requestor device. As used here, the term "control field" refers to one or more portions of the secure erase command that can be varied to different values by a requestor device to command the storage device to perform requested actions that are associated with a secure erase operation.

The control field can be set to different values to command the storage device to perform corresponding different actions associated with a secure erase operation. Setting a control field to a particular value refers to adjusting any part of the control field (e.g., setting a control bit in the control field to "0" or "1"). In one example, if it is desired that the storage device provides a report of a progress (e.g., percentage complete) of an erase operation, then the control field can be adjusted such that the part of the control field corresponding to the progress reporting action is set to the appropriate value. As other examples, other parts of the control field can be set to specify one or more of the following actions: abort the secure erase operation, interrupt the secure erase operation, pause the secure erase operation, or restart the secure erase operation.

Moreover, the control field can be set to specify a range of the storage media of the storage device to which the secure erase operation is to be applied. For example, the starting address of such range can be specified where the secure erase operation is to be performed in the portion of the storage media starting from the starting address all the way to the end of the storage media. As an alternative, both a starting address and an ending address can be specified to define a range on the storage media to which the secure erase operation is to be applied.

FIG. 1 is a block diagram of an exemplary arrangement that includes a requestor device 100 that is coupled by a link 102 to a storage device 104. The storage device 104 has storage media 106 and a storage controller 108 that controls access of the storage media 106. For example, the storage controller 108 can perform read operations, write operations, delete operations, or other operations with respect to data stored on the storage media 106. The storage controller 108 can also perform other tasks with respect to the storage media 106, such as performing a secure erase operation in response to a secure erase command.

The storage controller 108 has a command register 110. The requestor device 100 can issue a secure erase command that is written to the command register 110 (note that the command register 110 can also receive other types of commands relating to operation of the storage device 104). The storage controller 108 performs a secure erase operation according to the secure erase command that has been written to the command register 110.

A requestor device 100 includes a storage interface 112 to allow the requestor device 100 to communicate with the storage controller 108. In addition, the requestor device 100 has a storage device driver 114 that issues commands to the storage controller 108 through the storage interface 112. The storage device driver 114 can be part of an operating system 116 in the requestor device 100. The requestor device 100 also has application software 118.

The software modules in the requestor device, including the application software 118, operating system 116, and storage device driver 114, are executable on one or more central processing units (CPUs) 120 in the requestor device 100. The CPU(s) 120 is/are connected to memory 122 in the requestor device 100. The requestor device also includes a display device 124, which can be used to display information regarding operations performed at the storage device 104, including the progress of a secure erase operation. Also, the display device 124 can be used to display a graphical user interface (GUI) to allow a user to submit requests with respect to the storage device 104, including requests to perform a secure erase operation or actions associated with the secure erase operation.

In response to a request from the application software 118 (or alternatively, system firmware such as the BIOS or UEFI) specifying that a secure erase operation is to be performed at the storage device 104, the storage device driver 114 creates a secure erase command that is issued to the command register 110 of the storage controller 108 in the storage device 104. According to the AT Attachment specification, this command is referred to as a F4h command.

Figure 2:
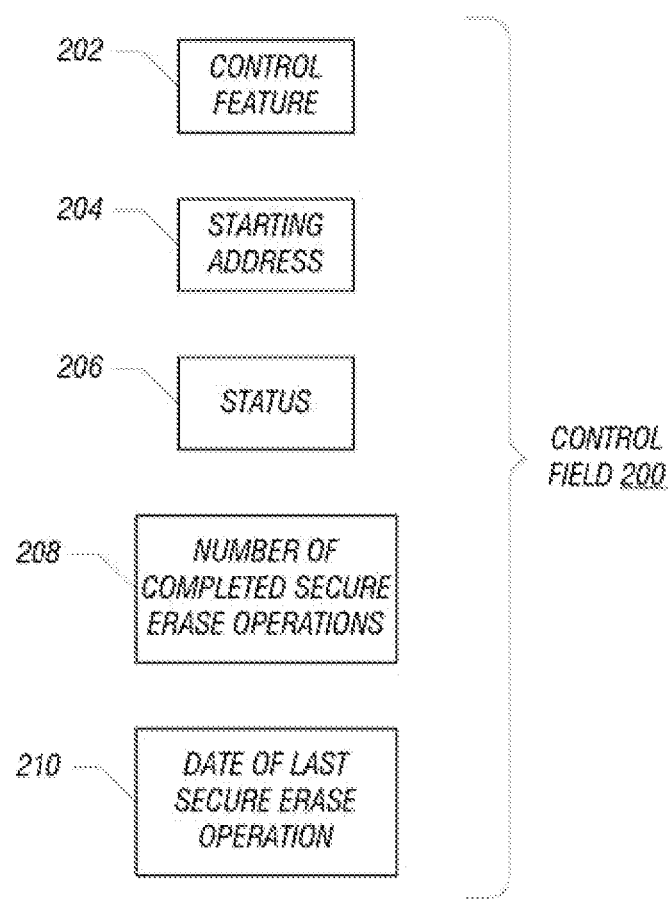
FIG. 2 illustrates a control field for a secure erase command, according to an embodiment.

The content of a control field 200 of a secure erase command that is written to the register 110 is depicted in FIG. 2, according to an exemplary embodiment. Note that not all of the content of the control field 200 in the command register 110 is shown in FIG. 2.

The control field 200 includes a control feature section 202 that can specify various actions to be performed with respect to the secure erase operation. For example, the feature section 202 can have a first control bit that can be set to a predetermined state to request that a progress of the secure erase operation be reported back to the requestor device 100. Other control bits can also be part of the control feature section 202, such as a control bit to specify that the secure erase operation is to be aborted, a control bit to specify that the secure erase operation is to be interrupted, a control bit to specify that the secure erase operation is to be paused, and a control bit to specify that the secure erase operation is to be restarted.

The control field 200 also includes a starting address section 204, which specifies the starting address (e.g., starting logical block address or LBA) of the portion of the storage media 106 to which the secure erase operation is to be applied. In some embodiments, the range specified by the starting address section 204 starts at the starting address and goes all the way to the end of the storage media 106. In an alternative implementation, both an arbitrary starting address and an arbitrary ending address can be specified, allowing for targeted erasure of some data on the storage media.

The control field 200 also includes a status section 206, which can be used to indicate an approximation of the percent of the secure erase operation that remains until completion (assuming the control feature section 202 was previously set to command the storage device 104 to perform progress reporting). In one example, a subsection (referred to as the "progress reporting subsection") of the status section 206 can have a value that can be adjusted in increments of 10%. Thus, this progress reporting subsection can have a value between 0 and 9, where 9 indicates 90% secure erase operation complete and 0 indicates 0% secure erase operation complete. In other implementations, the progress reporting subsection can use other values for representing the progress of the secure erase operation. For example, a reporting subsystem can use calibration and other techniques to convert percentile values into total time involved to complete the requested operation and amount of time left for the full completion.

Another subsection (referred to as the "execution status subsection") of the status section 206 can indicate the execution status of the secure erase operation. For example, the execution status subsection can be set to different values to indicate different execution status. For example, a first value can indicate that a previous secure erase operation completed without interruption or that no security erase operation has ever been run; a second value can indicate that the previous secure erase operation was aborted by the requester device; a third value can indicate that a secure erase operation is in active execution progress, and a fourth value can indicate that a previously issued secure erase command is currently in the paused state.

Restarting of a previously paused secure erase operation can be handled in one of several possible different ways. For example, a previously paused secure erase operation can be aborted and then a new secure erase command can be issued to start a new secure erase operation. Alternatively, the previously paused secure erase operation can be restarted and then aborted, followed by issuing a new secure erase command.

The control field 200 also includes a section 208 that indicates the number of secure erase operations that have completed. Another section 210 of the control field 200 can specify the date (or time) of the last secure erase operation.

The above elements of the control field 200 have been provided for purposes of example. In other implementations, the control field 200 can be used to provide other types of information regarding a secure erase operation, and the control field 200 can be adjusted to perform other types of actions with respect to a secure erase operation.

Figures 3, 4:
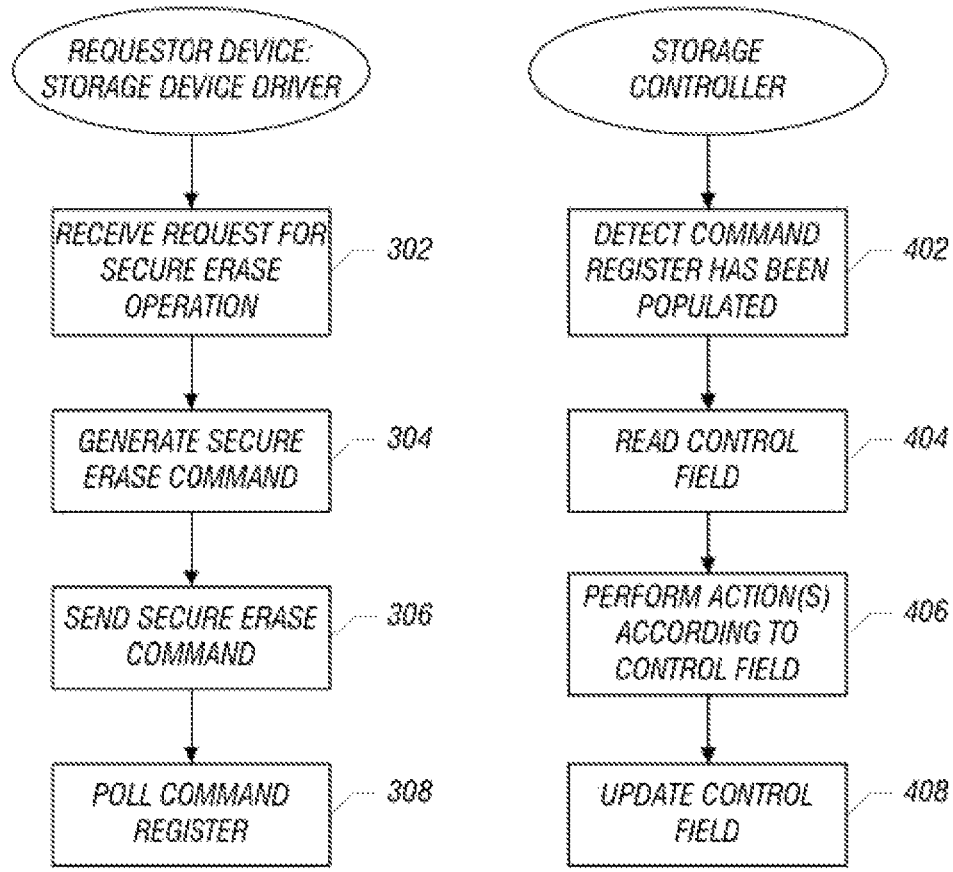
FIG. 3 is a flow diagram of a process of performed at a requester device for issuing a secure erase command, according to an embodiment.
FIG. 4 is a flow diagram of a process of performed at a storage device for processing a secure erase command, according to an embodiment.

FIG. 3 is a flow diagram of a process performed by the storage device driver 114 in the requestor device 100, according to an embodiment. The storage device driver 114 receives (at 302) a secure erase request from application software 118 (FIG. 1) (or alternatively, from system firmware). The secure erase request may have been issued by the application software 118 in response to a user request, such as a user request submitted through a GUI displayed in the display device 124 of the requestor device 100. The GUI may include fields that are filled in by the user to specify features of the secure erase operation to activate. One field may specify activation of the progress reporting feature.

Also, the GUI can have other fields or control elements to allow a user to specify other features to activate with respect to a secure erase operation that has already started, such as aborting the secure erase operation, interrupting the secure erase operation, pausing the secure erase operation, or restarting the secure erase operation. The secure erase request received from the application software 118 can indicate what features of the requested secure erase operation have been activated.

In response to the received secure erase request, the storage device driver 114 generates (at 304) a secure erase command, with the corresponding control field 200 (FIG. 2) populated to perform actions specified by the secure erase request. The generated secure erase command is then sent (at 306) to the storage device, which causes the secure erase command to be written to the command register 110 in the storage controller 108 of the storage device 104.

In one embodiment, the storage device driver 114 can periodically poll (at 308) the command register 110 to retrieve information relating to the secure erase operation that may be reported by the storage device 100. For example, the storage device driver 114 can periodically poll the command register 110 to determine a percentage of completion of the secure erase operation. The storage device driver can then provide the percentage of completion to the application software 118 for presentation to a user or for some other use. In other embodiments, the storage driver 114 can be notified by the storage device through another mechanism that does not involve active polling by the driver, such as being notified via an interrupt, or other such active notification mechanism.

FIG. 4 illustrates a process performed by the storage controller 108 in the storage device 104 (FIG. 1). The storage controller detects (at 402) that the command register 110 has been populated. In response to detecting that the command register 110 has been populated with a secure erase command, the storage controller 108 reads (at 404) the control field 200 of the secure erase command. Based on the content of the control field 200, the storage controller 108 performs (at 406) the corresponding action(s), including one or more of activating progress reporting, or modifying the secure erase operation.

As part of performing the secure erase operation, the storage controller 108 can update (at 408) the appropriate parts of the control field 200 to provide information pertaining to the secure erase operation. For example, if progress reporting has been activated, then the control field 200 can be updated to reflect a current progress of the secure erase operation. Other parts of the control field 200 that can be updated include parts for indicating a total number of previous secure erase operations that have completed, for indicating that a secure erase operation is in progress, for indicating that a previous secure erase operation completed without interruption, for indicating the date (or time) of completion of the last secure erase operation.

The tasks of FIG. 4 can be performed by software executable on the storage controller 108, or alternatively, the tasks can be performed by firmware embedded in the storage controller 108. As yet another alternative, the storage controller 108 can be configured with fixed circuitry to perform specified tasks.

Certain storage devices may not support all of the various features (e.g., progress reporting, pausing, restarting, aborting, interrupting, etc.) associated with secure erase operations discussed above. A user of the requestor device 100 may wish to know which of the features are supported and which are not. One technique of doing so is to submit secure erase commands with control fields populated to activate corresponding ones of the features. If an error is received from the storage device indicating that the submitted secure erase command with the requested feature is not supported, then the requestor device 100 may interpret that as the feature not being supported. This provides a way for the requestor device 100 to easily detect which of the features are supported and which are not. Another technique to indicate which of these features are supported is to perform an Identify Device command to the storage device, where the Identify Device command is issued by the requestor device to determine a configuration of the storage device. A response to the Identify Device command returned to the requestor device from the storage device will contain indications of which features are supported so the requestor device does not have to send individual commands to determine which features are supported and which are not.

Instructions of software described above (including any software executed by the storage controller 108 and the storage device driver 114 of FIG. 1) are loaded for execution on a processor (such as one or more CPUs 120 or the storage controller 108 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
storage media;
a controller to control access of the storage media, the controller to receive an erase command used to specify an erase operation of at least one portion of the storage media,
wherein the erase command has a control field controllable by a requestor device that submitted the erase command to the storage device, the control field having one or more portions settable to cause the storage device to perform one or more of: reporting a progress of the erase operation, and modifying an operational state of the erase operation.

2. The storage device of claim 1, wherein reporting the progress comprises reporting a percentage of completion of the erase operation.

3. The storage device of claim 1, wherein modifying the operational state of erase operation comprises one or more of pausing the erase operation, restarting the erase operation, aborting the erase operation, and interrupting the erase operation.

4. The storage device of claim 1, wherein the controller has a command register where the erase command is written by the requestor device.

5. The storage device of claim 1, wherein the control field further includes a section to specify a range that represents the at least one portion of the storage media that is to be subjected to the erase operation.

6. The storage device of claim 5, wherein the section in the control field specifies a starting address and ending address that define the range.

7. The storage device of claim 1, wherein the erase command is a secure erase command to overwrite the at least one portion of the storage media with a predefined pattern.

8. The storage device of claim 1, wherein the control field further includes a section to provide an indication of a progress of the erase operation, wherein the section is adjustable to different values to provide indications of different states of completion of the erase operation.

9. The storage device of claim 1, wherein the control field further includes a section to specify a total number of previous erase operations that have completed.

10. The storage device of claim 1, wherein the control field further includes a section to specify a date or time of a last secure erase operation that has completed.

11. An article comprising at least one computer-readable storage medium containing instructions that upon execution cause a processor to:
receive a request to perform a secure erase operation, wherein the request specifies at least one feature associated with the secure erase operation to activate, the at least one feature including one or more of: progress reporting of the secure erase operation; and modifying an operational state of the secure erase operation;
in response to receiving the request, generate a secure erase command having a control field populated with a value according to the at least one feature that has been activated; and
send the secure erase command to a storage device to command the storage device to activate the at least one feature associated with the secure erase operation.

12. The article of claim 11, wherein the instructions upon execution cause the processor to further:
if the control field of the secure erase command sent to the storage device was populated with a value to activate progress reporting of the secure erase operation, receive an indication of the progress of the secure erase operation reported by the storage device.

13. The article of claim 12, wherein receiving the indication of the progress of the secure erase operation comprises reading a register of a controller in the storage device.

14. The article of claim 11, wherein modifying the operational state of the secure erase operation comprises one or more of pausing the secure erase operation, restarting the secure erase operation, aborting the secure erase operation, and interrupting the secure erase operation.

15. A method of controlling an erase operation of a storage device comprising:
receiving, by the storage device from a requestor device, an erase command having a control field populated by the requestor device to command performance of one or more of reporting a progress of an erase operation of storage media in the storage device; and modifying an operational state of the erase operation;
in response to the erase command, performing, at the storage device, one or more of reporting a progress of an erase operation of storage media in the storage device; and modifying the erase operation.

16. The method of claim 15, further comprising:
if the control field of the erase command was populated to command progress reporting of the erase operation, providing an indication of a progress of the erase operation.

17. The method of claim 16, wherein providing the indication of the progress of the erase operation comprises updating the control field of the secure erase command in a command register of the storage device.

18. The method of claim 15, further comprising:
if the control field of the erase command was populated to command modifying operational state of the erase operation, performing one of: pausing the erase operation, restarting the erase operation, aborting the erase operation, and interrupting the erase operation.

* * * * *

UNITED STATES PATENT AND TRADEMARK OFFICE
CERTIFICATE OF CORRECTION

| | | |
|---|---|---|
| PATENT NO. | : 8,572,344 B2 | Page 1 of 1 |
| APPLICATION NO. | : 13/260300 | |
| DATED | : October 29, 2013 | |
| INVENTOR(S) | : Leonard E. Russo et al. | |

It is certified that error appears in the above-identified patent and that said Letters Patent is hereby corrected as shown below:

In the Claims:
In column 7, line 19, in Claim 3, delete "erase" and insert -- the erase --, therefor.

Signed and Sealed this
Twenty-eighth Day of January, 2014

Michelle K. Lee
*Deputy Director of the United States Patent and Trademark Office*